United States Patent
Niu et al.

(10) Patent No.: US 12,526,791 B2
(45) Date of Patent: Jan. 13, 2026

(54) SYSTEMS AND METHODS FOR UPLINK GAP CONFIGURATION FOR TRANSCEIVER CALIBRATION AND TRANSMIT POWER MANAGEMENT

(71) Applicant: APPLE INC., Cupertino, CA (US)

(72) Inventors: Huaning Niu, San Jose, CA (US); Bernhard Sogl, Unterhaching (DE); Dawei Zhang, Saratoga, CA (US); Giuseppe Patane, Munich (DE); Jalpesh Manishbhai Parmar, Neubiberg (DE); Qiming Li, Beijing (CN); Sharad Sambhwani, San Diego, CA (US); Thorsten Tracht, Munich (DE); Weidong Yang, San Diego, CA (US); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 403 days.

(21) Appl. No.: 17/441,655

(22) PCT Filed: Jan. 14, 2021

(86) PCT No.: PCT/CN2021/071773
§ 371 (c)(1),
(2) Date: Sep. 21, 2021

(87) PCT Pub. No.: WO2022/151158
PCT Pub. Date: Jul. 21, 2022

(65) Prior Publication Data
US 2023/0100583 A1    Mar. 30, 2023

(51) Int. Cl.
*H04W 72/1268*    (2023.01)
*H04W 72/0453*    (2023.01)

(52) U.S. Cl.
CPC ... *H04W 72/1268* (2013.01); *H04W 72/0453* (2013.01)

(58) Field of Classification Search
CPC ......... H04W 72/1268; H04W 72/0453; H04W 8/24; H04W 24/02; H04W 48/14; H04W 56/0045; H04W 36/0088
See application file for complete search history.

(56) References Cited

U.S. PATENT DOCUMENTS

| 2012/0051304 A1 | 3/2012 | Han et al. |
| 2014/0086116 A1 | 3/2014 | Seo et al. |

(Continued)

FOREIGN PATENT DOCUMENTS

| CN | 101895901 | 11/2010 |
| CN | 106416350 | 2/2017 |

(Continued)

OTHER PUBLICATIONS

International Preliminary Report on Patentability issued in PCT Application No. PCT/CN2021/071773, dated Jul. 27, 2023 in 6 pages.

(Continued)

*Primary Examiner* — Ricky Q Ngo
*Assistant Examiner* — Kabir U Jahangir
(74) *Attorney, Agent, or Firm* — Kilpatrick Townsend & Stockton LLP

(57) ABSTRACT

The present application relates to devices and components including apparatus, systems, and methods for configuring an uplink gap for a 5G NR user equipment.

20 Claims, 10 Drawing Sheets

(56) References Cited

U.S. PATENT DOCUMENTS

| | | | |
|---|---|---|---|
| 2014/0341192 A1 | 11/2014 | Venkob et al. | |
| 2015/0245235 A1 | 8/2015 | Tang et al. | |
| 2017/0230815 A1 | 8/2017 | Yasukawa et al. | |
| 2019/0021017 A1 | 1/2019 | Nagaraja et al. | |
| 2020/0112350 A1 | 4/2020 | Yang et al. | |
| 2020/0314896 A1* | 10/2020 | Koorapaty | H04W 72/21 |
| 2020/0351818 A1* | 11/2020 | Park | H04W 4/90 |
| 2020/0404671 A1* | 12/2020 | Karaki | H04L 5/0007 |
| 2021/0135770 A1* | 5/2021 | Schober | H04L 5/003 |
| 2021/0400513 A1* | 12/2021 | Raghavan | H04B 17/21 |
| 2021/0410024 A1* | 12/2021 | Tang | H04W 36/0088 |
| 2022/0330184 A1* | 10/2022 | Lei | H04W 56/001 |
| 2022/0399926 A1* | 12/2022 | Flordelis | H04W 52/146 |
| 2023/0038050 A1* | 2/2023 | Si | H04W 36/0088 |
| 2023/0156788 A1* | 5/2023 | Lunttila | H04W 74/0808 370/329 |
| 2023/0217322 A1* | 7/2023 | Peng | H04W 36/03 370/331 |
| 2023/0328684 A1* | 10/2023 | Wang | H04W 24/08 |

FOREIGN PATENT DOCUMENTS

| | | |
|---|---|---|
| CN | 106576332 | 4/2017 |
| CN | 110870349 | 3/2020 |
| EP | 2858405 A1 | 4/2015 |
| WO | 2020147128 | 7/2020 |

OTHER PUBLICATIONS

Article entitled: "PA Calibration Gaps for FR2 UEs", Nokia, Nokia Shanghai Bell, 3GPP TSG-RAN WG4 Meeting #87, R4-1807678, dated May 2018 in 2 pages.

International Search Report and Written Opinion issued in PCT Application No. PCT/CN2021/071773, dated Oct. 12, 2021 in 9 pages.

Documents entitled: "Motivation on UL gap for self-calibration and monitoring," Apple, Agenda Item 9.1.2, RP-201603, 3GPP TSG RAN Meeting #89e, Electronic Meeting, Sep. 14-18, 2020 in 6 pages.

Documents entitled: "New WID on NR RF Enhancements for FR2," 3GPP™ Work Item Description, RP-202042, Nokia, Nokia Shanghai Bell, 3GPP TSG RAN Meeting #89, Electronic Meeting, Sep. 14-18, 2020 in 4 pages.

Documents entitled: "FR2 RF Work Area in Rel-17," Moderator (Nokia), RP-201609, 3GPP TSG-RAN Meeting #89-3, Electronic Meeting, Sep. 14-18, 2020 in 10 pages.

3GPP TSG-RAN WG4 Meeting # 97-e; R4-2014516; Electronic Meeting, Nov. 2-13, 2020; Agenda item: 12.3.2.3; Title: Assumptions for study on FR2 UL gaps for self-calibration and monitoring; Nokia, Nokia Shanghai Bell in 3 pages.

Extended European Search Report issued in European Application No. EP21918367.0, dated Feb. 13, 2024 in 11 pages.

Technical Specification entitled "3rd Generation Partnership Project; Technical Specification Group Radio Access Network; NR; Requirements for support of radio resource management (Release 17)," 3GPP TS 38.133 V17.0.0 (Dec. 2020) in 2588 pages.

Technical Specificaion entled "3rd Generation Partnership Project; Technical Specification Group Radio Access Network; NR; Radio Resource Control (RRC) protocol specification (Release 16)," 3GPP TS 38.331 V16.3.1 (Jan. 2021) in 932 pages.

* cited by examiner

```
ULGapConfig ::=           SEQUENCE {
    ULgapFR2                  SetupRelease { gapConfig }
    ULgapFR2withGrant         SetupRelease { gapConfigwithGrant }
} gapConfig ::=             SEQUENCE {
    gapOffset                 INTEGER (0, ... 1279),
    mgl                       ENUMERATED {ms0dot375, ms0dot5, ms1, ms1dot5, ms3,
                                          ms3dot5, ms4, ms5dot5, ms6},
    mgrp                      ENUMERATED {ms160, ms320, ms640, ms1280},
} gapConfigwithGrant ::=    SEQUENCE {
    gapOffset                 INTEGER (0, ... 1279),
    mgl                       ENUMERATED {ms0dot375, ms0dot5, ms1, ms1dot5, ms3,
                                          ms3dot5, ms4, ms5dot5, ms6},
    mgrp                      ENUMERATED {ms160, ms320, ms640, ms1280},
    frequencyDomainAllocation BIT STRING (SIZE (18))
}
```

Figure 3

```
ULGapConfig ::=           SEQUENCE {
    ULgapFR2                  SetupRelease { gapConfig }
    ULgapFR2withGrant         SetupRelease { gapConfigwithGrant }
} gapConfig ::=             SEQUENCE {
    gapOffset                 INTEGER (0, ... 1279),
    mgl                       ENUMERATED {ms0dot375, ms0dot5, ms1, ms1dot5, ms3,
                                          ms3dot5, ms4, ms5dot5, ms6},
    mgrp                      ENUMERATED {ms160, ms320, ms640, ms1280},
}
```

Figure 4A

```
ULGapConfig ::=           SEQUENCE {
    ULgapFR2                  SetupRelease { gapConfig }
} gapConfig ::=             SEQUENCE {
    gapOffset                 INTEGER (0, ... 1279),
    mgl                       ENUMERATED {ms0dot375, ms0dot5, ms1, ms1dot5, ms3,
                                          ms3dot5, ms4, ms5dot5, ms6},
    mgrp                      ENUMERATED {ms160, ms320, ms640, ms1280},
}
```

Figure 4B

```
gapConfigwithGrant ::=    SEQUENCE {
    gapOffset                 INTEGER (0, ... 1279),
    mgl                       ENUMERATED {ms0dot375, ms0dot5, ms1, ms1dot5, ms3,
                                          ms3dot5, ms4, ms5dot5, ms6},
    mgrp                      ENUMERATED {ms160, ms320, ms640, ms1280},
    frequencyDomainAllocation BIT STRING (SIZE (18))
}
```

Figure 4C

SYSTEMS AND METHODS FOR UPLINK GAP CONFIGURATION FOR TRANSCEIVER CALIBRATION AND TRANSMIT POWER MANAGEMENT

This application is a 35 U.S.C. § 371 National Stage Entry of International Application No. PCT/CN2021/071773, filed on Jan. 14, 2021, which is incorporated herein by reference in its entirety for all purposes.

BACKGROUND

Third Generation Partnership Project (3GPP) Fifth Generation (5G) New Radio (NR) provides for communication between user equipment (UE) and a network (e.g., a gNB or other base station). Such communication may occupy frequency bands in Frequency Range 1 (FR1) (e.g., below 7.225 GHz) and/or Frequency Range 2 (FR2) (e.g., 24.250 GHz and above, also called mmWave).

BRIEF DESCRIPTION OF THE DRAWINGS

FIG. 3 shows an example of a code listing for an explicit gap configuration in accordance with some embodiments.

FIGS. 4A, 4B, and 4C show example of code listings for explicit gap configurations in accordance with some embodiments.

DETAILED DESCRIPTION

Figure 1:
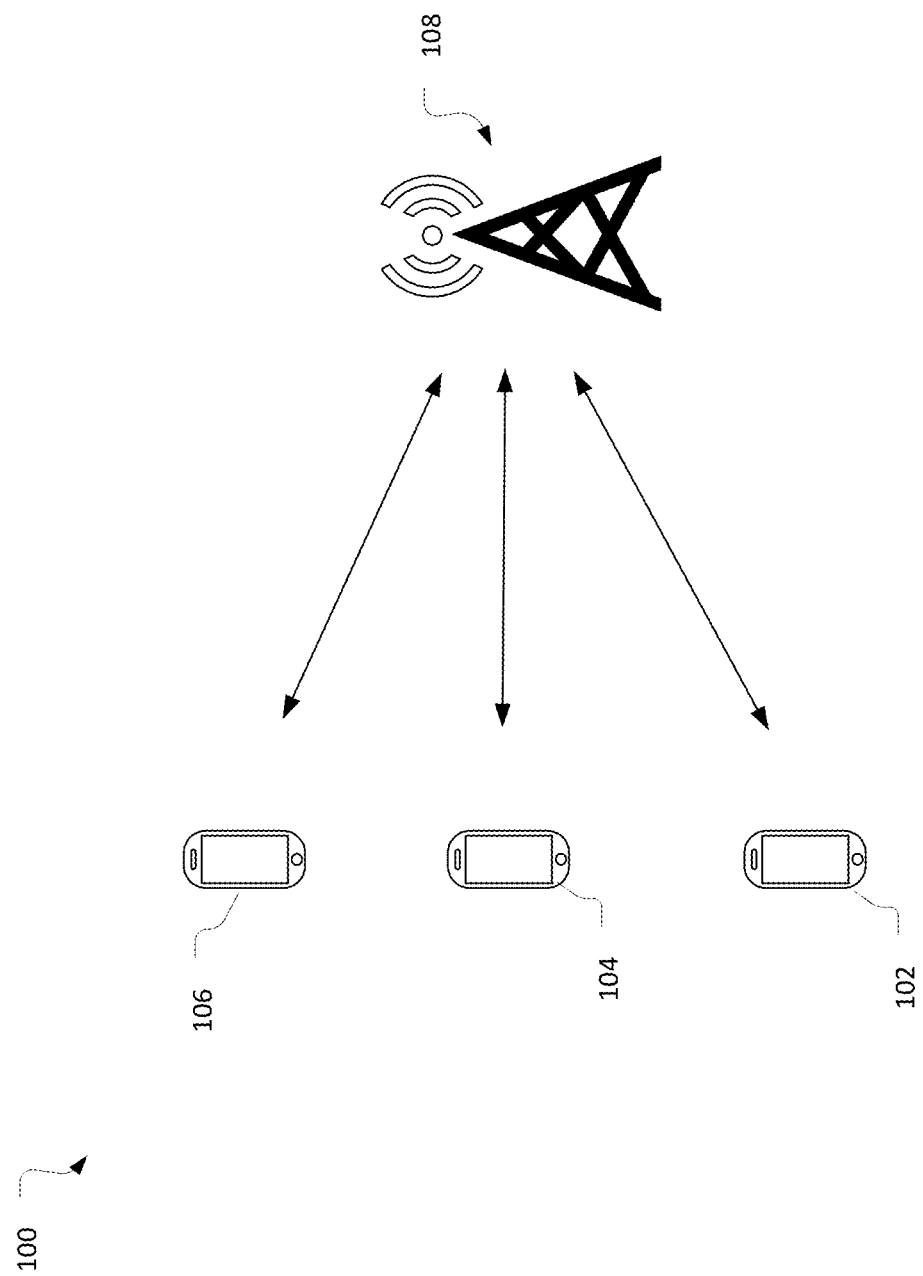
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include UEs 102, 104, and 106, and an access node 108. The access node 108 may be a base station that provides one or more wireless access cells, for example, 3GPP New Radio "NR" cells, through which one or more of the UEs 102/104/106 may communicate with the access node 108. In some aspects, the access node 108 is a Next Generation NodeB (gNB) that provides 3GPP New Radio (NR) cell. The air interfaces over which the UEs 102/104/106 and access node 108 communicate may be compatible with 3GPP technical specifications (TSs) such as those that define Fifth Generation (5G) NR system standards and may occupy frequency bands in Frequency Range 1 (FR1) (e.g., below 7.225 GHz), Frequency Range 2 (FR2) (e.g., 24.250 GHz and above, also called mmWave), or higher frequency bands (e.g., between 52.6 GHz and 71 GHz or 114.25 GHz).

In 5G networks, the downlink carrier may be divided into a number of bandwidth parts (BWPs). Such division may facilitate the efficient provision of services in an environment in which different devices have different channel bandwidth capabilities. The BWP may include a set of contiguous common resource blocks.

The access node 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a physical downlink shared channel (PDSCH); and a physical downlink control channel (PDCCH).

The PBCH may be used to broadcast system information that the UEs 102/104/106 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by a UE 102/104/106 during a cell search procedure and for beam selection.

The PDSCH may be used to transfer end-user application data, signaling radio bearer (SRB) messages, system information messages (other than, for example, a Master Information Block (MIB)), and paging messages.

The access node 108 may use a PDCCH to transmit downlink control information (DCI) to the UEs 102/104/106. The DCI may provide uplink resource allocations on a physical uplink shared channel (PUSCH), downlink resource allocations on a PDSCH, and various other control information. The DCI may also be used to provide uplink power control commands, configure a slot format, or indicate that preemption has occurred.

It may be desired to extend 5G NR to frequency bands other than those currently used. For example, NR beyond 52.6 GHz up to 114.25 GHz may be considered. Frequencies between 52.6 GHz and 71 GHz are especially interesting in the short term, because of their proximity to sub-52.6 GHz (current NR system) and imminent commercial opportunities for high data rate communications, e.g., (un)licensed spectrum between 57 GHz and 71 GHz. 5G NR in unlicensed spectrum (NR-U) provides for both license-assisted and standalone use of unlicensed spectrum.

For implementing such extension, it may be desirable to leverage Frequency Range 2 (FR2) design to the extent possible. FR2, as used herein, may indicate a frequency range of 24.25 GHz to 52.6 GHz. For example, it may be beneficial to use aspects of existing waveforms (e.g., existing downlink (DL)/uplink (UL) NR waveform) to support operation at frequencies between 52.6 GHz and 71 GHz and beyond if feasible, to take advantage of such opportunities by minimizing specification burden and required changes and maximizing the leverage of FR2-based implementations. Such aspects may include applicable numerology including subcarrier spacing (SCS), channel BW (including maximum), and their impact to FR2 physical layer design to support system functionality considering, for example, practical radio-frequency (RF) impairments; channel access mechanism assuming beam-based operation in order to comply with the regulatory requirements applicable to unlicensed spectrum for frequencies between 52.6 GHz and 71 GHz, etc.

It may be desired to further enhance FR2 coverage, signal quality and/or UE performance. For example, it may be desired to improve power efficiency and/or overall system throughput. Some FR2 enhancements may involve operations that should be performed during run-time but may not be compatible with transmission and/or reception of data or control signals (e.g., calibration and/or measurement operations). Due to unavoidable hardware sharing, various identified FR2 enhancements may rely on and benefit from a periodic uplink (UL) gap, during which time the UE can perform calibration and measurement (e.g., over the air and/or through an internal loop) without interrupting UL transmission/reception (Tx/Rx). Examples of such operations may include any of the following:

1) power amplifier (PA) efficiency and power consumption: for calibration of a PA, it may be desired to perform periodic measurements of one or more characteristics of the PA (e.g., gain, linearity).
2) transceiver calibration (e.g., due to temperature variation): it may be desired to perform transceiver calibration periodically at runtime in order to compensate for transceiver impairments. A calibration network may also help to maximize beamforming gain of the antenna array, thereby optimizing FR2 system performance. Typical usage cases of transceiver calibration may include any one or more of PA calibration (Tx), I/Q imbalance (Tx/Rx), local oscillator (LO) leakage (Tx) and DC offset (Rx), etc.
3) UE transmit (Tx) power management: it may be desirable for a UE to adaptively and efficiently adjust its output power to maximize UL coverage and/or throughput while maintaining compliance with regulatory requirements. Transmit power management may benefit from periodic monitoring of information from the surrounding environment (e.g., body proximity).

Other self-calibration and/or monitoring operations are not precluded. At least some of the aforementioned self-calibration and monitoring mechanisms may be generalized as a basic scheme in which the UE sends and receives a calibration signal, either over the air or through another internal loop between Tx and Rx hardware. Since the hardware used for UL transmission is partially shared by self-calibration and monitoring, UL transmission may be interrupted momentarily by such an operation. It may be desired to minimize such disruption by providing a preconfigured UL gap, during which time the UE can perform operations for FR2 RF enhancement, such as calibration and/or measurement (e.g., transceiver calibration and Tx power management).

Figure 2A:
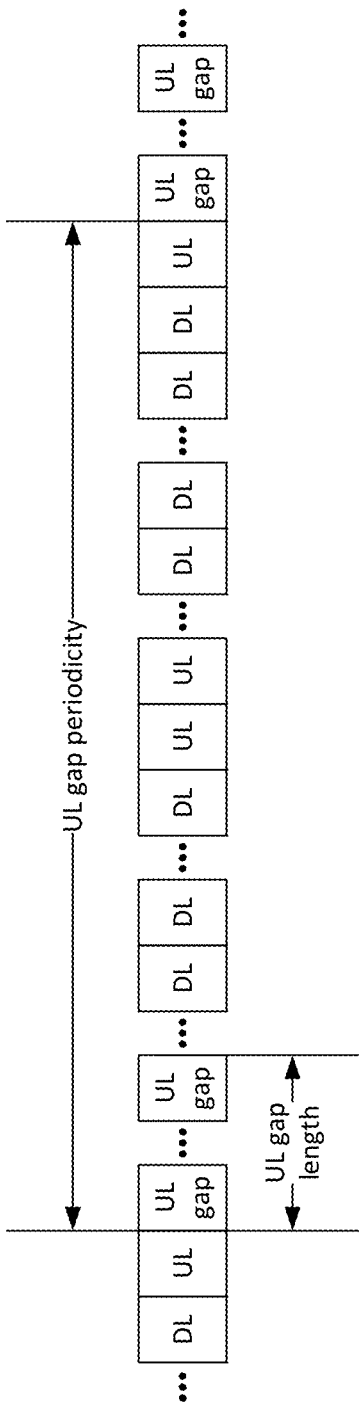
FIG. 2A shows an example of a DL/UL schedule that illustrates the parameters of UL gap periodicity and UL gap length in accordance with some embodiments.

It may be desired for a UL gap configuration, which may specify values such as gap length, gap periodicity and/or gap location, to be UE-specific and network-configured (e.g., configured via Radio Resource Control (RRC) and/or Medium Access Control-Control Element (MAC-CE)). FIG. 2A shows an example of a DL/UL schedule that illustrates the parameters of UL gap periodicity and UL gap length (duration) in the context of a time sequence of DL/UL periods.

To minimize the impact on UL scheduling and throughput performance, it may be desired to impose one or more limits on the parameters of the UL gap and/or on operation of the UE during the UL gap. In one example, it may be desired to maintain the UL gap length below a certain percentage X (e.g., less than, or not more than, X %) of the slot length. (By way of an example only, and without any limitation on the value or range of values of X that may be used, the value of X may be in a range of from 0.5% to 1%.) In another example, output power of a UE during an UL gap may be restricted. For example, the UE may be restricted from transmitting anything over the air during the UL gap, or a maximum related output power of the UE during the UL gap may be limited by a value Y, which may be indicated in, for example, dBm/MHz. To avoid a UE-coexistence issue, it may be desired to take spurious emission and UE co-existence requirements as specified in 3GPP TS 38.101-3 v16.5.0 (2020 November) as the reference.

It may be desired to introduce a UL gap for general self-calibration and monitoring purposes. It may be desired for such a gap to be subject to one or more restrictions, such as one or both of the following:

1) To minimize the impact on UL scheduling and throughput performance, the duty cycle of the UL gap should be maintained below [X]%.
2) During the UL gap, the UE should either not transmit anything, or the related output power is limited by [Y]dBm/MHz.

Figure 2B:
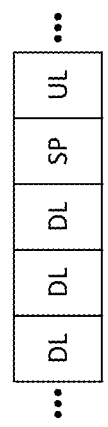
FIG. 2B shows an example of an UL/DL configuration in accordance with some embodiments.

It may be desired for the UL gap to have a bursty pattern. For example, each UL gap may be from one to three slots long, or at least three slots long. In one example, the UL gap length is 3×0.125 ms. Alternatively, UL gap length may be configured in terms of a number of symbols, rather than in terms of time (e.g., ms) or in terms of a number of slots. Configuring UL gap length in terms of a number of symbols may allow an UL gap to occur within a special subframe in which a few symbols are UL symbols within a special slot. FIG. 2B shows an example of an UL/DL configuration that includes a special slot SP.

It may be desired for the UL gap periodicity (e.g., the period between the beginning of an UL gap and the beginning of the next UL gap) to be relatively long (e.g., several or many times longer than a frame), such as about 100 ms or more. In some implementations, a UL gap may be configured to have a gap length that is longer than the number of UL slots in one UL/DL configuration period. When the UL gap length is longer than the number of UL slots in one UL/DL configuration period, the UL gap slots may be spread into multiple UL/DL configuration periods.

It may be desired to provide for two different types of gaps: a type of gap with UL grant, and a type of gap without UL grant. A gap with UL grant may be used for a case in which radiated power is to be emitted over the air during the UL gap. Examples of operations to be performed within a gap with UL grant may include PA calibration, measurement of LO leakage, and/or measurement of DC offset. (Measurement of LO leakage and/or DC offset tends to be cheaper with over-the-air emission than without.) A gap without UL grant may be used for a case in which no over-the-air emission by the UE is to occur during the UL gap (e.g., calibration through an internal loop). Examples of operations to be performed within a gap without UL grant may include measurement of LO leakage and/or DC offset (tends to be a more expensive solution than with over-the-air emission) and/or obtaining measurements from a body proximity sensor (BPS) (e.g., for Tx power management and/or beam management).

A first example of a gap configuration method is an explicit gap configuration of an UL gap (e.g., an UL calibration gap) for FR2. A gap pattern may be configured without emission (e.g., no UL grant). Alternatively or additionally, another gap pattern may be configured with emission (e.g., an UL grant).

FIG. 3 shows an example of a code listing for a parameter ULGapConfig that includes a gap configuration ULgapFR2 for an UL gap without emission and a gap configuration ULgapFR2withGrant for an UL gap with emission. In one example, the parameter ULGapConfig which includes these configurations is an Information Element, which may be carried by a RRC message (e.g., a RRC Reconfiguration message).

The code listing of FIG. 3 includes an example of an explicit gap configuration ULgapFR2 for an UL gap without emission. This configuration includes sets of values for the offset of the gap pattern (specified in FIG. 3 as gapOffset and ranging from 0 to (periodicity −1)), the gap length (specified in FIG. 3 as Measurement Gap Length or mgl), and the gap periodicity (specified in FIG. 3 as Measurement Gap repetition Period or mgrp). In this particular example, the set of values for gapOffset is the integers in the range of from 0 to 1279; the enumerated set of values for mgl is 0.375, 0.5, 1, 3, 3.5, 4, 5.5, and 6 ms; and the enumerated set of values for mgrp is 160, 320, 640, and 1280 ms.

The code listing of FIG. 3 also includes an example of an explicit gap configuration ULgapFR2withGrant for an UL gap with emission. This configuration includes sets of values for the offset of the gap pattern (specified in FIG. 3 as gapOffset and ranging from 0 to (periodicity −1)), the gap length (specified in FIG. 3 as Measurement Gap Length or mgl), and the gap periodicity (specified in FIG. 3 as Measurement Gap repetition Period or mgrp). In this particular example, the set of values for gapOffset is the integers in the range of from 0 to 1279; the enumerated set of values for mgl is 0.375, 0.5, 1, 3, 3.5, 4, 5.5, and 6 ms; and the enumerated set of values for mgrp is 160, 320, 640, and 1280 ms.

In the case of a UL gap with emission (e.g., ULgapFR2withGrant), it may be also desired to configure a frequency resource. As shown in FIG. 3, the parameter gapConfigwithGrant may also include a frequency domain allocation, which may be used in a corresponding UL gap configuration to specify one or frequency bands within FR2. During the UL gap, the UE may be configured to emit radiated power within the specified band or bands (e.g., subject to a maximum output power limitation as described herein).

FIG. 4A shows an example of a code listing for a parameter ULGapConfig that includes an explicit gap configuration ULgapFR2 only for an UL gap without emission (e.g., as described above). FIG. 4B shows another example of a code listing for a parameter ULGapConfig that includes an explicit gap configuration ULgapFR2 only for an UL gap without emission (e.g., as described above).

It may be desired for the UE to apply a timing advance when identifying the start of a UL gap. For example, it may be desired to the UE to identify the start of a UL gap by reusing the latest UE-specific value of the Timing Advance (TA). The Timing Advance is a network-configured parameter that is used to align UL Rx symbol timing at a gNB with DL Tx symbol timing at the gNB.

A second example of a gap configuration method is a mixed method in which an explicit gap configuration is used for an UL gap (e.g., an UL calibration gap) without emission, and a configured grant is reused for an UL gap with UL grant. FIG. 4C shows an example of a code listing for a parameter gapConfigwithGrant that includes an explicit gap configuration only for an UL gap with emission (e.g., as described above). For an UL gap with a UL grant, it may be desired to reuse a Release-15 (R15)/Release-16 (R16) Type 1 or Type 2 Configured Grant (CG) (e.g., as specified in 3GPP TS 38.331 v15.3.0 (2018 October)). For a Type 1 CG, the uplink grant is provided by RRC signaling. For a Type 2 CG, the uplink grant is configured by RRC signaling and is activated or deactivated by MAC-CE signaling. For 120 kHz subcarrier spacing (SCS), periodicity can be up to 5120 slots (640 ms). The gap duration (length) may be specified by a number of slots as indicated by a repetition k (repK) parameter of the CG, which can be configured to indicate a value of up to eight slots.

In a first option, the CG may be configured in a similar manner to other CG configurations. In this case, it may be possible for the access node (e.g., gNB) to behave as follows:

1) High energy is detected, and no Demodulation Reference Signal (DMRS) correlation is successful. The access node will not process the transmission.
2) Upon a false alarm of DMRS success, the access node may trigger dynamic retransmission, which may cause resource waste.

A second option is for the access node (e.g., gNB) to transmit the CG using a combination that is invalid for RRC CG configurations. For example, the access node may be configured to use, in a Type 1 transmission, an MCS (Modulation Coding Scheme) index that is not valid for Type 1 transmission (e.g., MCS 31). Since an MCS index of 31 is not expected for an initial transmission, a CG configuration that indicates an MCS index of 31 is not a valid CG configuration. In such manner, by using a combination of parameter values that is invalid for purposes of transmitting uplink data to a base station within the configured grant, an access node may signal to a UE that the UE may use this configuration for calibration. Other such invalid combinations are also possible: for example, a Sounding Reference Signal (SRS) configuration that indicates an antenna port number which is higher than the corresponding UE capability indication.

In a third example of a gap configuration method, both UL gaps with emission and UL gaps without emission may follow a Configured UL grant (e.g., as Type 1 and Type 2). As mentioned above, the access node may be configured to use an unused (e.g., invalid) combination of parameters to indicate that this is a special UL grant. Such an approach may avoid gNB computation complexity for DMRS correlation and/or may avoid gNB triggering dynamic retransmission grant. The grant may be counted into a maximum number of a configured grant list.

A fourth example of a gap configuration method is an autonomous gap (e.g., without grant). In Long Term Evolution (LTE) and R15, an autonomous gap may be used for Cell Group Identity (CGI) reading. To enable an autonomous gap for UL calibration, it may be desired for the UE to report its capability to support a UL calibration gap. For example, such UE capability may be specified under a band combination to enable per-FR2 band configuration of autonomous gap capability (e.g., autonomous band). When a UE supports an autonomous FR2 UL calibration gap, the UE may be allowed to suspend UL transmission (e.g., discontinuous transmission or "DTX") occasionally for calibration purposes. Such a method may potentially be extended to Frequency Range 3 (FR3, >52.6 GHz band) in the future.

In one example, a parameter (e.g., [AutonomousGapForTxCalibration]) may be defined (e.g., per UE, and per band or band combination). Such a parameter may indicate whether the specified UE supports an autonomous gap for transceiver calibration. When the UE supports an autonomous UL calibration gap, the UE may be allowed to DTX UL transmission occasionally for calibration purpose.

It may be desired to support UE feedback for UL gap preference. For example, a configuration parameter such as otherConfig as specified in TS 38.331 v15.3.0 (2018 October) may include many UE preferences for different configurations. One or more UE preferences for UL gap configuration can also be included in such a parameter, such as any one or more of the following preferences:
1) UE preferred gap periodicity and length
2) UE preferred gap type: gap without grant, gap with grant, or autonomous gap, or combination of those.

A UL gap may be provided in response to an event-triggered request from a UE. Examples of such an event may include an indication that a value of a monitored parameter has exceeded a specified threshold value for the monitored parameter. One example of such an indication may be a detection that a temperature has risen above a specified threshold value (e.g., indicating that the UE needs online calibration). Another example of such an indication may be an indication that the UE needs to perform body proximity sensing (e.g., to obtain a measurement from a body proximity sensor or BPS) to estimate Power Management-Maximum Power Reduction (P-MPR), which may arise in a situation such as either of the following:
1) when the UE has large amount of data to transmit, or
2) when the UE is in a cell edge, and needs maximum transmit power for coverage.

FIGS. 5-8 present a number of operation flows/algorithmic structures in accordance with aspects of this disclosure. These operation flow/algorithmic structures describe a number of operations in a particular sequence. However, the presented sequences are not restrictive. That is, the operations may be performed in sequences other than those specifically presented.

Figure 5:
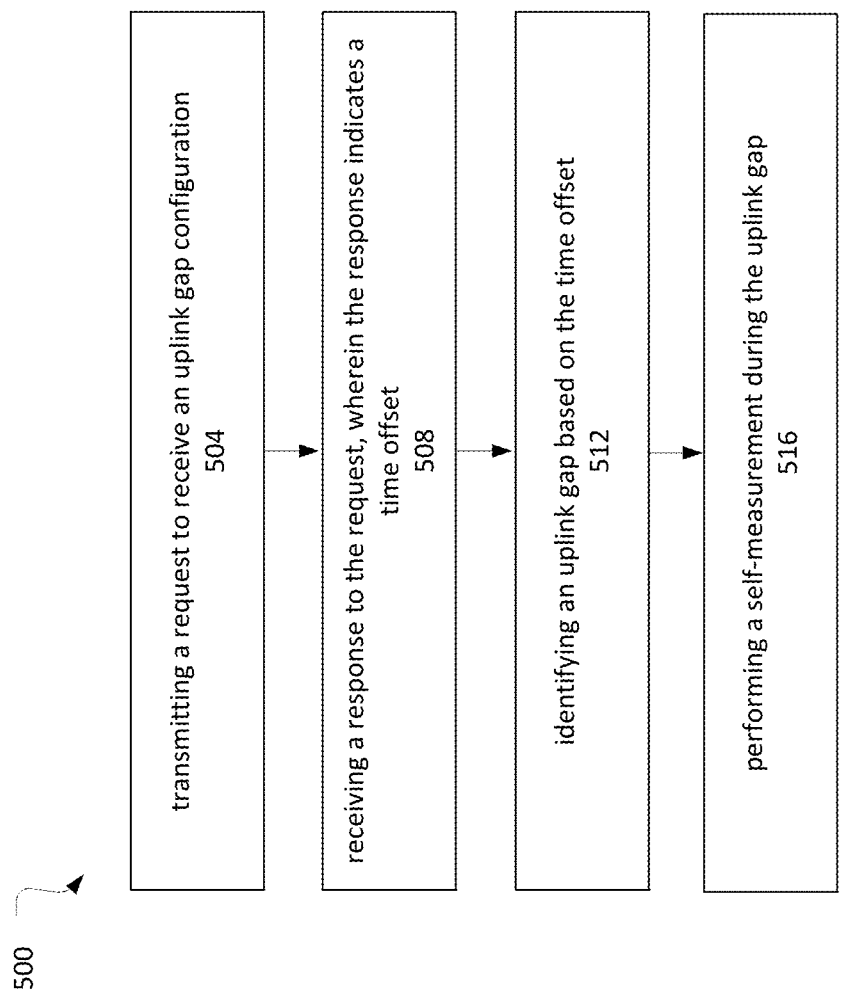
FIG. 5 illustrates an operational flow/algorithmic structure (e.g., as may be performed or implemented by a UE) in accordance with some embodiments.

FIG. 5 illustrates an operational flow/algorithmic structure 500 in accordance with some embodiments. The operation flow/algorithmic structure 500 may be performed or implemented by a UE such as, for example, UE 102, 104, 106 or 900; or components thereof, for example, baseband processor 904A.

The operation flow/algorithmic structure 500 may include, at 504, transmitting a request to receive an uplink gap configuration. In some aspects, the request may indicate, for example, a periodicity of the uplink gap, a length of the uplink gap, and/or a preferred type of UL gap.

The operation flow/algorithmic structure 500 may include, at 508, receiving a response to the request, wherein the response indicates a time offset. In some aspects, the indication may a value of a gapOffset parameter.

The operation flow/algorithmic structure 500 may include, at 512, identifying an uplink gap based on the time offset. In some aspects, the identifying may include applying a current value of a Timing Advance parameter.

The operation flow/algorithmic structure 500 may include, at 516, performing a self-measurement during the uplink gap. In some aspects, the method may further include performing a transceiver calibration or transmit-power management operation based on the self-measurement.

Figure 6:
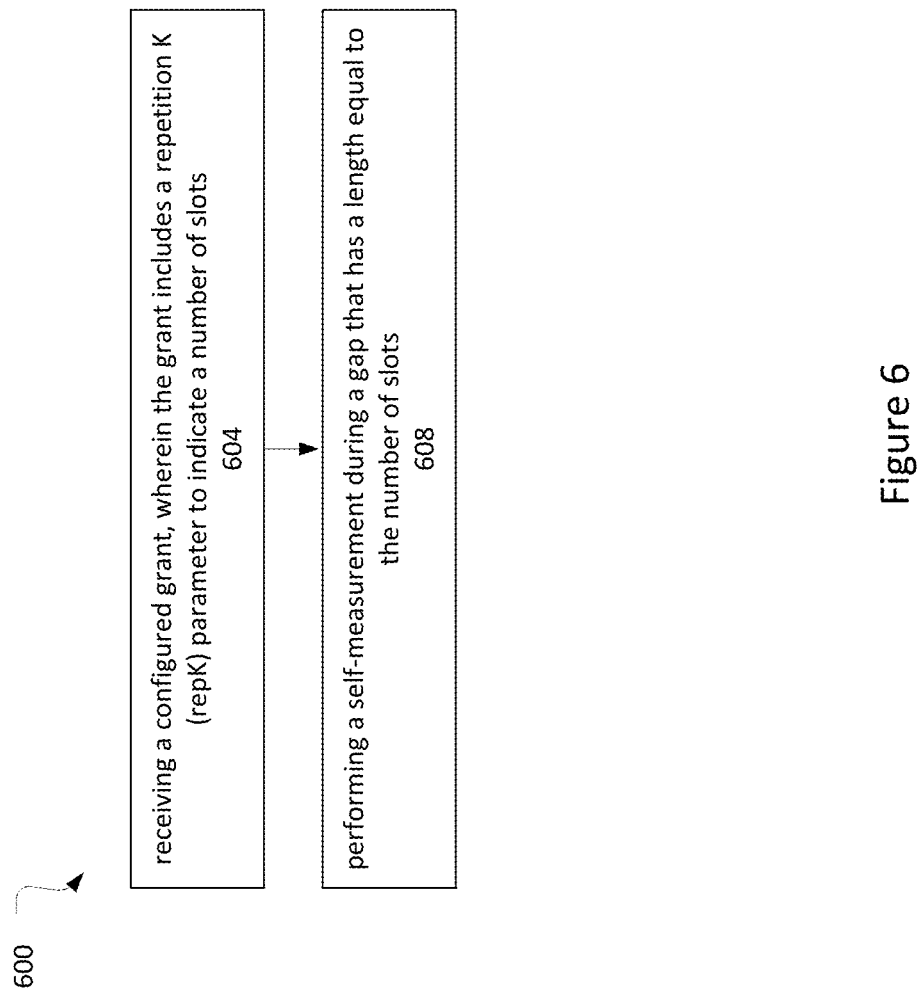
FIG. 6 illustrates an operational flow/algorithmic structure (e.g., as may be performed or implemented by a UE) in accordance with some embodiments.

FIG. 6 illustrates an operational flow/algorithmic structure 600 in accordance with some embodiments. The operation flow/algorithmic structure 600 may be performed or implemented by a UE such as, for example, UE 102, 104, 106 or 900; or components thereof, for example, baseband processor 904A.

The operation flow/algorithmic structure 600 may include, at 604, receiving a configured grant, wherein the grant includes a repetition K (repK) parameter to indicate a number of slots. In some aspects, the received configured grant includes a combination of parameter values that is invalid for purposes of transmitting uplink data to the access node within the configured grant.

The operation flow/algorithmic structure 600 may include, at 608, performing a self-measurement during a gap that has a length equal to the number of slots. In some aspects, the number of slots is one, two, or three slots.

Figure 7:
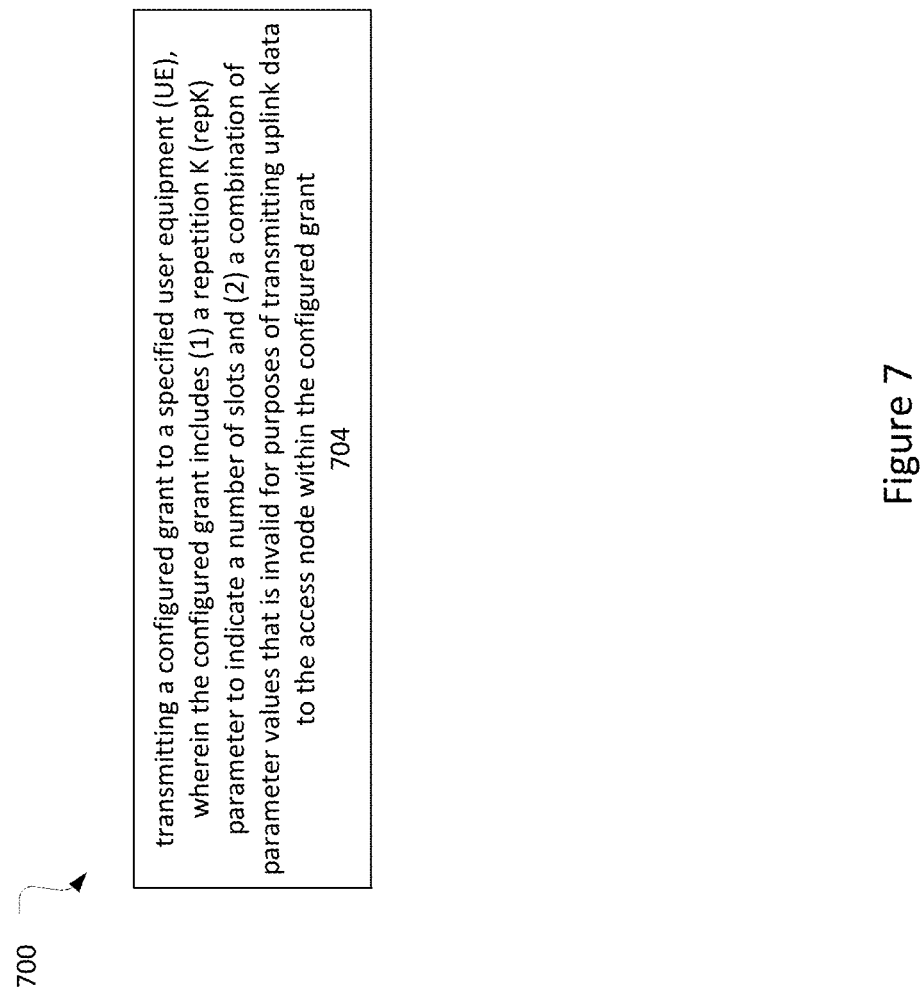
FIG. 7 illustrates an operational flow/algorithmic structure (e.g., as may be performed or implemented by an access node) in accordance with some embodiments.

FIG. 7 illustrates an operational flow/algorithmic structure 700 in accordance with some embodiments. The operation flow/algorithmic structure 700 may be performed or implemented by an access node (e.g., a base station and/or gNB) such as, for example, access node 108 or 1000; or components thereof, for example, baseband processor 1004A.

The operation flow/algorithmic structure 700 may include, at 704, transmitting a configured grant to a specified user equipment (UE), wherein the configured grant includes (1) a repetition K (repK) parameter to indicate a number of slots and (2) a combination of parameter values that is invalid for purposes of transmitting uplink data to the access node within the configured grant. In some aspects, the configured grant indicates a frequency domain allocation that indicates at least one subcarrier in Frequency Range 2 (FR2).

Figure 8:
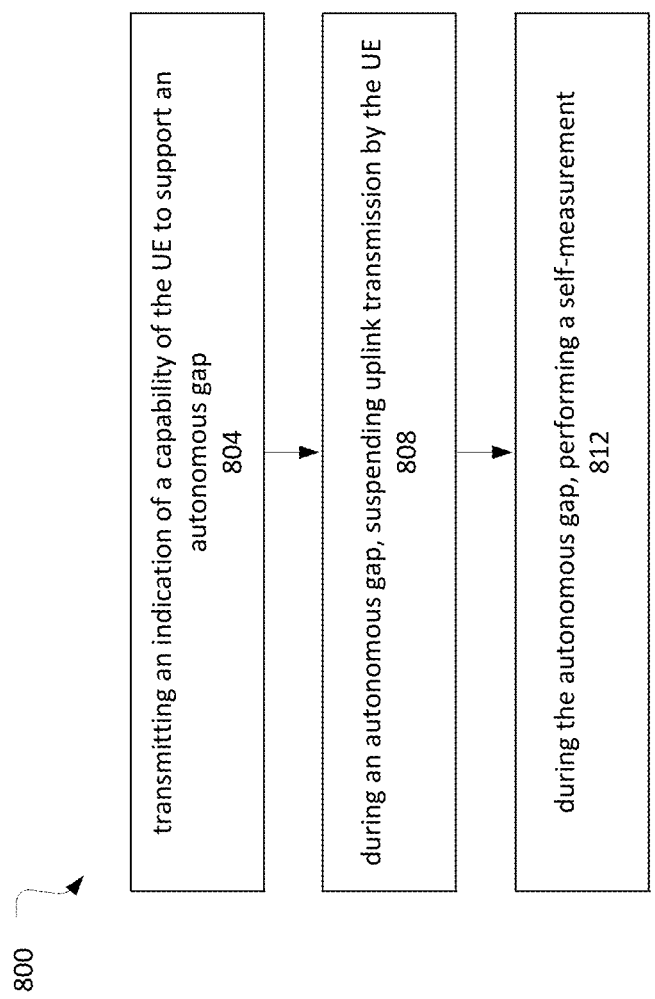
FIG. 8 illustrates an operational flow/algorithmic structure (e.g., as may be performed or implemented by a UE) in accordance with some embodiments.

FIG. 8 illustrates an operational flow/algorithmic structure 800 in accordance with some embodiments. The operation flow/algorithmic structure 800 may be performed or implemented by a UE such as, for example, UE 102, 104, 106 or 900; or components thereof, for example, baseband processor 904A.

The operation flow/algorithmic structure 800 may include, at 804, transmitting an indication of a capability of the UE to support an autonomous gap. In some aspects, the transmitted indication indicates a capability of the UE to support the autonomous gap in at least one specified frequency band within Frequency Range 2 (FR2).

The operation flow/algorithmic structure 800 may include, at 808, during an autonomous gap, suspending uplink transmission by the UE. In some aspects, the UE may perform DTX to suspend UL transmission.

The operation flow/algorithmic structure 800 may include, at 812, during the autonomous gap, performing a self-measurement. In some aspects, the method may further include performing a transceiver calibration or transmit-power management operation based on the self-measurement.

Figure 9:
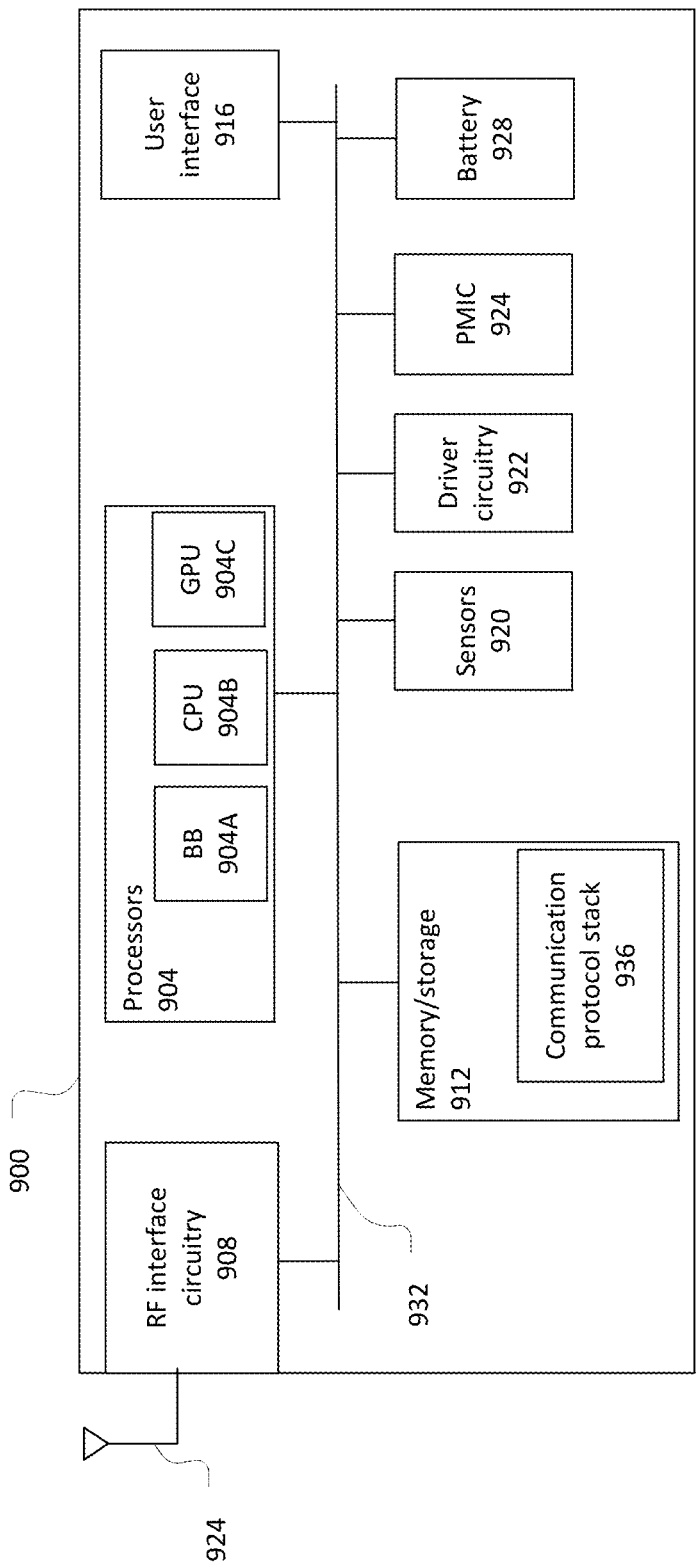
FIG. 9 illustrates a user equipment (UE) in accordance with some embodiments.

FIG. 9 illustrates a UE 900 in accordance with some embodiments. The UE 900 may be similar to and substantially interchangeable with UEs 102, 104, or 106.

The UE 900 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 900 may include processors 904, RF interface circuitry 908, memory/storage 912, user interface 916, sensors 920, driver circuitry 922, power management integrated circuit (PMIC) 924, antenna structure 926, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangement of the components shown may occur in other implementations.

The components of the UE 900 may be coupled with various other components over one or more interconnects 932, which may represent any type of interface, input/output, bus (local, system, or expansion), transmission line, trace, optical connection, etc. that allows various circuit components (on common or different chips or chipsets) to interact with one another.

The processors 904 may include processor circuitry such as, for example, baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 912 may include one or more non-transitory, computer-readable media that includes instructions (for example, communication protocol stack 936) that may be executed by one or more of the processors 904 to cause the UE 900 to perform various operations described herein. The memory/storage 912 may also store CSI IMR, reporting, and rate pattern configuration information as described elsewhere.

The memory/storage 912 include any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 908 may include transceiver circuitry and radio frequency front module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 926 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 926.

In various embodiments, the RF interface circuitry 908 may be configured to transmit/receive signals in a manner compatible with NR access technologies.

The antenna 926 may include antenna elements to convert electrical signals into radio waves to travel through the air and to convert received radio waves into electrical signals. The antenna elements may be arranged into one or more antenna panels. The antenna 926 may have antenna panels that are omnidirectional, directional, or a combination thereof to enable beamforming and multiple input, multiple output communications. The antenna 926 may include microstrip antennas, printed antennas fabricated on the surface of one or more printed circuit boards, patch antennas, phased array antennas, etc. The antenna 926 may have one or more panels designed for specific frequency bands including bands in FR1 or FR2.

The user interface circuitry 916 includes various input/output (I/O) devices designed to enable user interaction with the UE 900. The user interface 916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 900.

The sensors 920 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 922 may include software and hardware elements that operate to control particular devices that are embedded in the UE 900, attached to the UE 1100, or otherwise communicatively coupled with the UE 900. The driver circuitry 922 may include individual drivers allowing other components to interact with or control various input/output (I/O) devices that may be present within, or connected to, the UE 900. For example, driver circuitry 922 may include a display driver to control and allow access to a display device, a touchscreen driver to control and allow access to a touchscreen interface, sensor drivers to obtain sensor readings of sensor circuitry 920 and control and allow access to sensor circuitry 920, drivers to obtain actuator positions of electro-mechanic components or control and allow access to the electro-mechanic components, a camera driver to control and allow access to an embedded image capture device, audio drivers to control and allow access to one or more audio devices.

The PMIC 924 may manage power provided to various components of the UE 900. In particular, with respect to the processors 904, the PMIC 924 may control power-source selection, voltage scaling, battery charging, or DC-to-DC conversion.

A battery 928 may power the UE 900, although in some examples the UE 900 may be mounted deployed in a fixed location, and may have a power supply coupled to an electrical grid. The battery 928 may be a lithium ion battery, a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
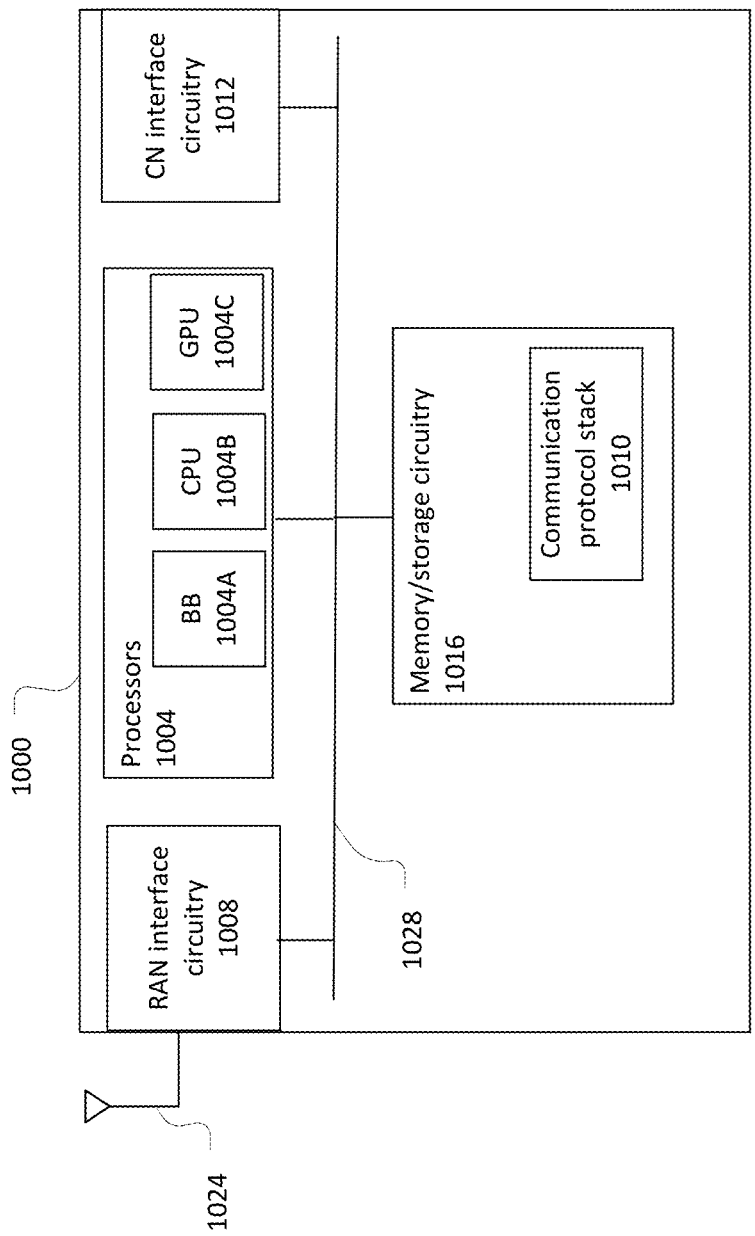
FIG. 10 illustrates an access node (e.g., a base station and/or gNB) in accordance with some embodiments.

FIG. 10 illustrates an access node (e.g., a base station and/or gNB) 1000 in accordance with some embodiments. The access node 1000 may be similar to and substantially interchangeable with access node 108.

The access node 1000 may include processors 1004, RF interface circuitry 1008, core network (CN) interface circuitry 1012, memory/storage circuitry 1016, and antenna structure 1026.

The components of the access node 1000 may be coupled with various other components over one or more interconnects 1028.

The processors 1004, RF interface circuitry 1008, memory/storage circuitry 1016 (including communication protocol stack 1010), antenna structure 1026, and interconnects 1028 may be similar to like-named elements shown and described with respect to FIG. 6.

The CN interface circuitry 1012 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the access node 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising transmitting a request for an uplink gap configuration; receiving a response to the request, wherein the response indicates a time offset; identifying an uplink gap based on the response; and performing, during the uplink gap, a self-measurement or a calibration.

Example 2 includes the method of example 1 or some other example herein, wherein the response indicates the time offset in terms of a number of milliseconds, a number of slots, or a number of symbols.

Example 3 includes the method of example 1 or some other example herein, wherein the response also indicates a periodicity of the uplink gap or a length of the uplink gap in terms of a number of milliseconds, a number of slots, or a number of symbols.

Example 4 includes the method of example 1 or some other example herein, wherein the response indicates that a length of the gap spans over a plurality of uplink/downlink configuration periods.

Example 5 includes the method of example 1 or some other example herein, wherein the transmitting the request is performed in response to an indication that a value of a monitored parameter has exceeded a specified threshold value for the monitored parameter.

Example 6 includes the method of example 5 or some other example herein, wherein the monitored parameter is a temperature.

Example 7 includes the method of example 1 or some other example herein, wherein the method further comprises receiving a timing advance value that is specific to the UE; and identifying a timing of the uplink gap based on the timing advance value.

Example 8 includes the method of example 1 or some other example herein, wherein the response indicates that the uplink gap is configured with uplink grant.

Example 9 includes the method of example 8 or some other example herein, wherein the performing a self-measurement or a calibration includes emitting radiated power during the uplink gap.

Example 10 includes the method of example 8 or some other example herein, wherein the response also indicates a frequency domain allocation that indicates at least one Resource Block, and wherein the performing a self-measurement or a calibration includes emitting radiated power on the at least one Resource Block during the uplink gap.

Example 11 includes the method of example 1 or some other example herein, wherein the performing, during the uplink gap, a self-measurement or a calibration includes performing a self-measurement during the uplink gap and also performing a transmit-power management operation based on the self-measurement; or performing a transceiver calibration during the uplink gap.

Example 12 includes the method of any of examples 1 to 11 or some other example herein, wherein the method comprises transmitting preference information relating to the uplink gap configuration, the preference information indicating a preferred gap periodicity or a preferred gap length.

Example 13 includes the method of any of examples 1 or 11 or some other example herein, wherein the method comprises transmitting preference information relating to the uplink gap configuration, the preference information indicating a UE-preferred gap type of a gap without grant of a frequency domain allocation or a gap with grant of a frequency domain allocation.

Example 14 includes a method of operating a UE, the method comprising receiving a configured grant, wherein the grant includes a repetition K (repK) parameter to indicate a number of slots; and performing a self-measurement during a gap that has a length equal to the number of slots.

Example 15 includes the method of example 14 or some other example herein, wherein the method further comprises detecting that the received configured grant includes a combination of parameter values that is invalid for purposes of transmitting uplink data to an access node within the configured grant.

Example 16 includes the method of example 14 or some other example herein, wherein the number of slots is one, two, or three slots.

Example 17 includes the method of example 14 or some other example herein, wherein the method further comprises receiving a timing advance value that is specific to the UE, wherein a time at which the gap begins is based on the received timing advance value.

Example 18 includes the method of example 14 or some other example herein, wherein the configured grant indicates a frequency domain allocation that indicates at least one Resource Block in Frequency Range 2 (FR2), and wherein the performing a self-measurement or a calibration includes emitting radiated power in compliance with the frequency domain allocation.

Example 19 includes the method of example 14 or some other example herein, wherein the method further comprises transmitting a parameter indicating a gap configuration for an uplink gap without uplink grant.

Example 20 includes the method of any of examples 14 to 19 or some other example herein, wherein the method further comprises transmitting preference information relating to the configured grant, the preference information indicating at least one among a preferred gap periodicity and a preferred gap length.

Example 21 includes the method of any of examples 14 to 19 or some other example herein, wherein the method further comprises transmitting preference information relating to the configured grant, the preference information indicating a UE-preferred gap type of a gap without grant of a frequency domain allocation or a gap with grant of a frequency domain allocation.

Example 22 includes a method of operating an access node (e.g., a gNB), the method comprising transmitting a configured grant to a specified user equipment (UE), wherein the configured grant includes a repetition K (repK) parameter to indicate a number of slots, and wherein the configured grant also includes a combination of parameter values that is invalid for purposes of transmitting uplink data to the access node within the configured grant.

Example 23 includes the method of example 22 or some other example herein, wherein the configured grant indicates a frequency domain allocation that indicates at least one Resource Block in Frequency Range 2 (FR2).

Example 24 includes the method of any of examples 22 or 23 or some other example herein, wherein the method comprises receiving preference information, the preference information indicating at least one among a preferred gap periodicity and a preferred gap length, wherein the configured grant is based on the preference information.

Example 25 includes the method of any of examples 22 or 23 or some other example herein, wherein the method comprises receiving preference information, the preference information indicating a UE-preferred gap type of a gap without grant of a frequency domain allocation or a gap with grant of a frequency domain allocation, wherein the configured grant is based on the preference information.

Example 26 includes a method of operating a UE, the method comprising transmitting an indication of a capability of the UE to support an autonomous gap; during an autonomous gap, suspending uplink transmission by the UE; and during the autonomous gap, performing a self-measurement.

Example 27 includes the method of example 26 or some other example herein, wherein the transmitted indication indicates a capability of the UE to support the autonomous gap in at least one specified frequency band within Frequency Range 2 (FR2).

Example 28 includes the method of example 1 or some other example herein, wherein the self-measurement comprises transmitting a signal in accordance with a UE-specific uplink grant.

Example 29 includes the method of example 1 or some other example herein, wherein the self-measurement comprises determining a gain or a linearity of a power amplifier.

Example 30 includes the method of example 1 or some other example herein, wherein the self-measurement comprises obtaining a measurement from a body proximity sensor.

Example 31 includes the method of example 1 or some other example herein, wherein the calibration comprises generating a radio-frequency signal over an internal loop without over-the-air emission.

Example 32 includes the method of example 1 or some other example herein, wherein the calibration comprises determining an I/Q imbalance, a local oscillator leakage, or a DC offset.

Example 33 includes the method of example 1 or some other example herein, wherein the calibration comprises compensating for an I/Q imbalance, a local oscillator leakage, or a DC offset.

Example 34 may include an apparatus comprising means to perform one or more elements of a method described in or related to any of examples 1-33, or any other method or process described herein.

Example 35 may include one or more non-transitory computer-readable media comprising instructions to cause an electronic device, upon execution of the instructions by one or more processors of the electronic device, to perform one or more elements of a method described in or related to any of examples 1-233, or any other method or process described herein.

Example 36 may include an apparatus comprising logic, modules, or circuitry to perform one or more elements of a method described in or related to any of examples 1-33, or any other method or process described herein.

Example 37 may include a method, technique, or process as described in or related to any of examples 1-33, or portions or parts thereof.

Example 38 may include an apparatus comprising: one or more processors and one or more computer-readable media comprising instructions that, when executed by the one or more processors, cause the one or more processors to perform the method, techniques, or process as described in or related to any of examples 1-33, or portions thereof.

Example 39 may include a signal as described in or related to any of examples 1-33, or portions or parts thereof.

Example 40 may include a datagram, information element, packet, frame, segment, PDU, or message as described in or related to any of examples 1-33, or portions or parts thereof, or otherwise described in the present disclosure.

Example 41 may include a signal encoded with data as described in or related to any of examples 1-33, or portions or parts thereof, or otherwise described in the present disclosure.

Example 42 may include a signal encoded with a datagram, IE, packet, frame, segment, PDU, or message as described in or related to any of examples 1-64, or portions or parts thereof, or otherwise described in the present disclosure.

Example 43 may include an electromagnetic signal carrying computer-readable instructions, wherein execution of the computer-readable instructions by one or more processors is to cause the one or more processors to perform the method, techniques, or process as described in or related to any of examples 1-33, or portions thereof.

Example 44 may include a computer program comprising instructions, wherein execution of the program by a processing element is to cause the processing element to carry out the method, techniques, or process as described in or related to any of examples 1-33, or portions thereof.

Example 45 may include a signal in a wireless network as shown and described herein.

Example 46 may include a method of communicating in a wireless network as shown and described herein.

Example 47 may include a system for providing wireless communication as shown and described herein.

Example 48 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:
   generate a request for an uplink gap configuration associated with body proximity sensing for transmit-power management;
   process a response to the request, wherein the response indicates a time offset, an uplink gap length, and an uplink gap repetition period, wherein the uplink gap length indicates a number of consecutive uplink slots within the uplink gap repetition period to identify an uplink gap with the number of consecutive uplink slots; and
   perform, during the uplink gap, the body proximity sensing for transmit-power management.

2. The one or more non-transitory computer-readable media according to claim 1, wherein the uplink gap repetition period is indicated in terms of a number of milliseconds, a number of slots, or a number of symbols.

3. The one or more non-transitory computer-readable media according to claim 1, wherein the instructions, when executed, cause the processing circuitry to generate the request in response to an indication that a value of a monitored parameter has exceeded a specified threshold value for the monitored parameter.

4. The one or more non-transitory computer-readable media according to claim 3, wherein the monitored parameter is a temperature.

5. The one or more non-transitory computer-readable media according to claim 1, the instructions, when executed, further cause the processing circuitry to:
   process a timing advance value that is specific to a user equipment (UE); and
   identify a timing of the uplink gap based on the timing advance value.

6. The one or more non-transitory computer-readable media according to claim 1, wherein the response indicates that the uplink gap is configured with an uplink grant.

7. The one or more non-transitory computer-readable media according to claim 1, wherein the transmit-power management includes emission of radiated power during the uplink gap.

8. The one or more non-transitory computer-readable media according to claim 1, wherein the response also indicates a frequency domain allocation that indicates at least one resource block, and
   wherein the transmit-power management includes emission of radiated power on the at least one resource block during the uplink gap.

9. An apparatus comprising:
   processing circuitry to:
      process a configured grant, wherein the configured grant includes a repetition K (repK) parameter to indicate a number of slots, and wherein the configured grant indicates a frequency domain allocation that indicates at least one resource block in frequency range 2 (FR2); and emit radiated power to perform self-measurement or calibration in compliance with the frequency domain allocation during a gap that has a length equal to the number of slots; and memory interface circuitry coupled with the processing circuitry to store the repetition K (repK) parameter in a memory.

10. The apparatus of claim 9, wherein the processing circuitry is further to detect that the received configured grant includes a combination of parameter values that is invalid for purposes of transmitting uplink data to an access node within the configured grant.

11. The apparatus of claim 9, wherein the number of slots is one, two, or three slots.

12. The apparatus of claim 9, wherein the processing circuitry is further to process a timing advance value that is specific to a user equipment (UE), wherein a time at which the gap begins is based on the received timing advance value.

13. The apparatus of claim 9, wherein the processing circuitry is further configured to transmit a parameter indicating a gap configuration for an uplink gap without uplink grant.

14. The apparatus of claim 9, wherein the processing circuitry is further to transmit preference information relating to the configured grant, the preference information indicating at least one among a preferred gap periodicity and a preferred gap length.

15. The apparatus of claim 9, wherein the processing circuitry is further to transmit preference information relating to the configured grant, the preference information indicating a UE-preferred gap type of a gap without grant of a frequency domain allocation or a gap with grant of a frequency domain allocation.

16. A method comprising:
generating a request for an uplink gap configuration associated with body proximity sensing for transmit-power management;
processing a response to the request, wherein the response indicates a time offset, an uplink gap length, and an uplink gap repetition period, that wherein the uplink gap length indicates a number of consecutive uplink slots within the uplink gap repetition period to identify an uplink gap with the number of consecutive uplink slots; and
performing, during the uplink gap, the body proximity sensing for transmit-power management.

17. The method of claim 16, wherein the uplink gap repetition period is indicated in terms of a number of milliseconds, a number of slots, or a number of symbols.

18. The method of claim 16, further comprising:
generating the request in response to an indication that a value of a monitored parameter has exceeded a specified threshold value for the monitored parameter.

19. The method of claim 18, wherein the monitored parameter is a temperature.

20. The method of claim 16, further comprising:
processing a timing advance value that is specific to a user equipment (UE); and
identifying a timing of the uplink gap based on the timing advance value.

* * * * *